United States Patent

[11] 3,617,508

| [72] | Inventor | Joseph P. Gurawitz<br>Munster, Ind. |
|---|---|---|
| [21] | Appl. No. | 812,695 |
| [22] | Filed | Apr. 2, 1969 |
| [45] | Patented | Nov. 2, 1971 |
| [73] | Assignee | Standard Oil Company<br>Chicago, Ill. |

[54] HYDROCRACKING PROCESS WITH DRYING OF HYDROGEN GAS RECYCLE
5 Claims, 1 Drawing Fig.

[52] U.S. Cl.......................................................... 208/111
[51] Int. Cl..........................................................C10g 13/02,
C10g 13/04, C10g 13/06
[50] Field of Search............................................ 208/59, 95,
111, 120, 209, 210, 212, 187

[56] References Cited
UNITED STATES PATENTS

| 3,011,967 | 12/1961 | Schmitkons et al........... | 208/140 |
| 3,239,449 | 3/1966 | Graven et al. ................. | 208/210 |
| 3,318,803 | 5/1967 | Broughton.................... | 208/187 |
| 3,140,253 | 7/1964 | Plank et al..................... | 208/120 |
| 3,201,343 | 8/1965 | Bicek ............................ | 208/95 |
| 3,256,177 | 6/1966 | Tulleners et al. ............. | 208/59 |
| 3,458,433 | 7/1969 | Wood et al. ................... | 208/111 |

Primary Examiner—Delbert E. Gantz
Assistant Examiner—G. J. Crasanakis
Attorneys—Arthur G. Gilkes, William T. McClain and John J. Connors

ABSTRACT: Low-boiling hydrocarbons from a hydrocracking reactor are treated with water to wash out ammonia and some hydrogen sulfide. Hydrogen gas is separated from the low-boiling hydrocarbons and dried before mixing with the feed to remove any water swept up with the separated hydrogen gas. The feed may also be passed through a dryer to remove water therefrom. Catalyst deactivation is minimized with a feed-hydrogen mixture containing less than 5 p.p.m. water by weight.

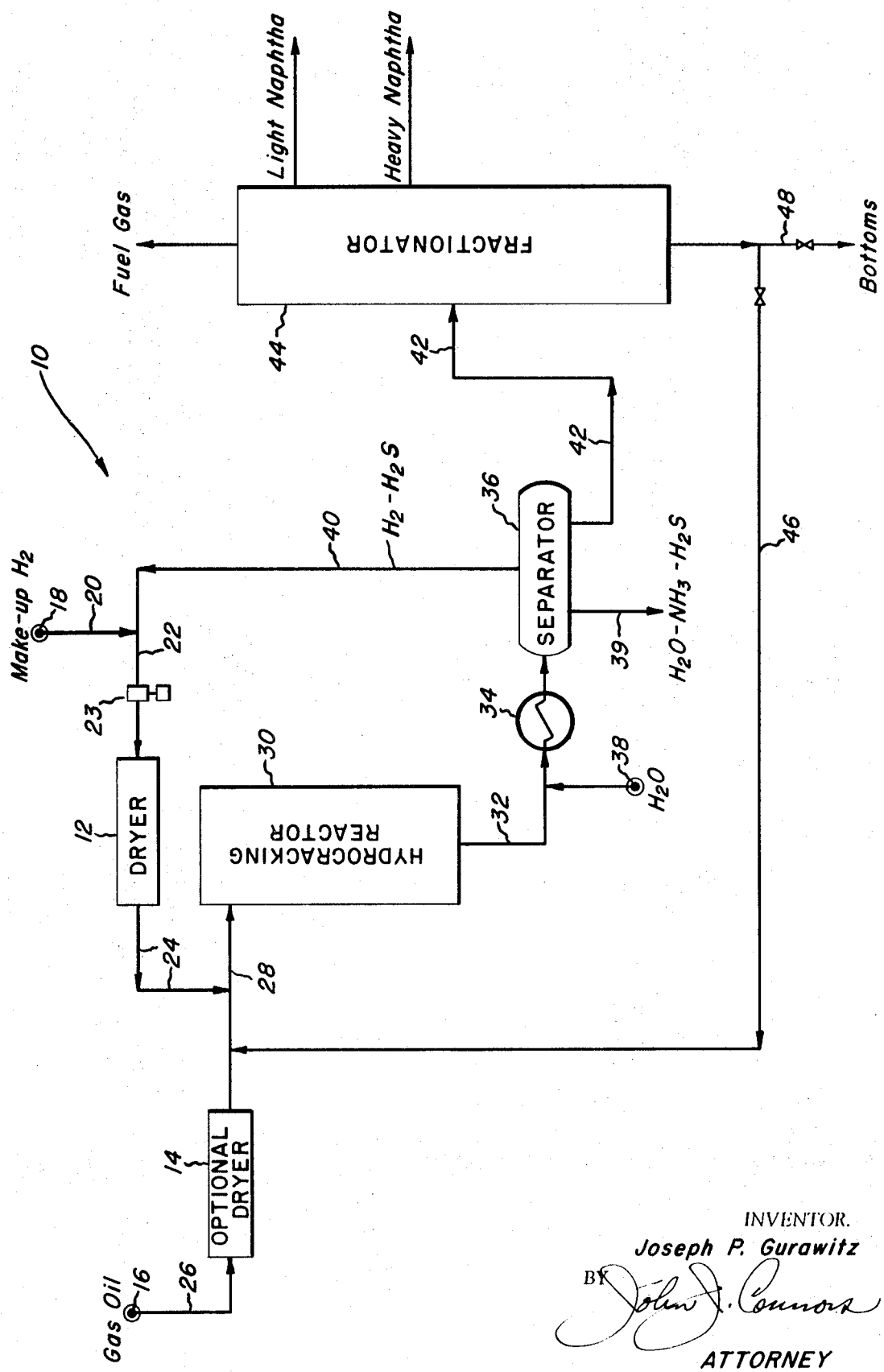

HYDROCRACKING PROCESS WITH DRYING OF HYDROGEN GAS RECYCLE

BACKGROUND OF THE INVENTION

In the petroleum industry, hydrocracking is a conventional process for converting high-boiling hydrocarbons into more valuable lower boiling products. The hydrocracking process employs porous catalyst and hydrogen gas which is mixed with the high boiling hydrocarbon. The high-boiling hydrocarbon and hydrogen are brought into contact with the catalyst, and they permeate the pore structure of the catalyst, and as the molecules of the high-boiling hydrocarbon contact the active sites of the catalyst, they split apart into lower molecular weight hydrocarbons.

Hydrocracking may be carried out in either a two-stage system or a single-stage system. In the two-stage system, the high-boiling hydrocarbon is initially treated to remove organic nitrogen and sulfur compounds and then passed into a hydrocracking zone where hydrocracking occurs. In the single-stage system, the high-boiling hydrocarbon is hydrocracked in the presence of the organic nitrogen and sulfur compounds. Because of this, the reaction conditions in the single-stage system are more severe than the reaction conditions in the two-stage system.

The hydrocracking catalyst which is used in either the two-stage hydrocracking system or the single-stage hydrocracking system will become deactivated with use, and the yield of lower boiling hydrocarbon products will become consequently fall off. One reason for the decline in the catalyst activity is that the pore structure of the catalyst collapses, reducing the total amount of surface available and thus decreasing the number of active catalytic sites available for hydrocracking. This collapse of the catalyst's pore structure is accelerated if water contacts the catalyst, and catalysts normally used in the single-stage hydrocracking system are particularly susceptible to this deleterious effect of water. In addition, the mere presence of water during hydrocracking results in a reduction in the yield of naphtha, one of the most valuable products derived from high-boiling hydrocarbons.

BRIEF DESCRIPTION OF THE INVENTION

According to my invention, an improved single-stage hydrocracking system is provided when the feed is dried to remove water. Normally if the dried feed contains less than about 5 parts by weight of water per million parts by weight of feed, the pore structure of the hydrocracking catalyst remains intact for a substantially longer period than if the feed contained water. Thus, catalyst life is extended and the high yields of lower boiling hydrocarbons are maintained for longer periods. Moreover, because water is absent during hydrocracking, higher yields of naphthas are attainable.

DESCRIPTION OF THE PREFERRED EMBODIMENT

The FIGURE, which schematically illustrates my invention, depicts a single-stage hydrocracking system 10 equipped with suitable dryers 12 and 14 to dry the hydrogen gas and high boiling hydrocarbon to be cracked. As shown in this Figure, gas oil from source 16 is mixed with hydrogen gas from source 18. The hydrogen gas first passes through lines 20, 22, and compressor 23 into dryer 12, and when it flows from dryer 12 via line 24, it is virtually water free. The gas oil, depending on its manner of preprocessing, may or may not contain water. If substantial quantities of water are present in the gas oil, then dryer 14 is employed. The gas oil flows via line 26 through dryer 14 before it is mixed with the dry hydrogen gas. After drying, the mixture of gas oil and hydrogen contain less than 5 parts by weight of water per million parts by weight of feed (gas oil and hydrogen gas).

The dried mixture flows via line 28 into hydrocracking reactor 30, which contains a suitable hydrocracking catalyst, and as the feed flows downwardly through reactor 30 contacting the catalyst, the molecules of the gas oil are split apart into low molecular weight hydrocarbons. During hydrocracking, organic nitrogen and sulfur molecules also split apart to produce ammonia and hydrogen sulfide. This mixture of ammonia, hydrogen sulfide, and low molecular weight, low-boiling hydrocarbons constitute the effluent from reactor 30, which flows via line 32 through heat exchanger 34, and then into separator 36. Water from source 38 is added to the effluent to wash out ammonia. As effluent and water flow through heat exchanger 34, they are mixed thoroughly, and the ammonia dissolves in the water. The water and dissolved ammonia and some dissolved hydrogen sulfide are withdrawn from separator 36 via line 39. Any unreacted hydrogen gas and remaining hydrogen sulfide are withdrawn from separator 36 via line 40, and are then passed through dryer 12 and then recycled to reactor 30. Thus any water swept up with the gases in line 40 is removed before recycle to reactor 30. The low-boiling hydrocarbons leave separator 36 via line 42 and flow into fractionator 44 where they are divided into a spectrum of different hydrocarbon materials having different boiling ranges, for example, fuel gas, light and heavy naphthas, and heavy bottoms. The bottoms are either recycled to reactor 30 via valved line 46 or withdrawn via valved line 48.

An example of a suitable hydrocracking catalyst is a mixture of a porous, noncrystalline, inorganic cracking material; molecular sieves; and oxides of metals, sulfides of metals, or metals in Group VI-A or Group VIII of the Periodic Table. The preferred catalyst comprises an alumina-silica supporting matrix in which are dispersed molecular sieves, said sieve-matrix mix being impregnated with oxides of cobalt or oxides of molybdenum or a mixture of these oxides. The alumina-silica matrix preferably contains from about 10 to about 50 weight percent alumina, and from about 0.1 to about 0.5 parts by weight of the sieve to 1 part by weight of the matrix. Based on the total weight of the mix, generally from about 1 to about 30 weight percent of the metal oxide is sufficient to impart a high level of hydrogenating activity to the catalyst.

Suitable hydrocracking conditions are maintained in reactor 30. Typical conditions are temperatures ranging between about 600° and about 800°F., pressures ranging between about 500 and about 2,500 p.s.i.g., space velocities ranging between about 0.5 and about 3.0 volumes of feed per hour per volume of catalyst, and hydrogen feed ranging between about 500 and about 15,000 standard cubic feet per barrel of feed. Because the feed is water free, the pore structure of the catalyst is not rapidly disintegrated. If water were present under the severe conditions required in the single-stage hydrocracking system, a more rapid catalyst disintegration would occur. Moreover, the absence of water during hydrocracking insures maximum naphtha yield.

I claim:

1. A process for hydrocracking a high-boiling hydrocarbon feed containing organic nitrogen and sulfur compounds, comprising the steps of:

a. passing the feed and substantially water-free hydrogen through a hydrocracking reactor containing a suitable hydrocracking catalyst maintained at suitable hydrocracking conditions, said catalyst gradually deactivating when contacted by water and said feed-hydrogen mixture containing less than 5 parts by weight of water per million parts by weight of feed so that catalyst deactivation is minimized, whereby the feed splits apart into lower boiling hydrocarbons, and ammonia and hydrogen sulfide are produced, b. withdrawing the low-boiling hydrocarbons, the ammonia and the hydrogen sulfide from the reactor and then adding water to said withdrawn materials to wash out ammonia and some hydrogen sulfide, and c. separating any unreacted hydrogen gas from the low-boiling hydrocarbons, and mixing said separated hydrogen gas with feed to be passed through the reactor, said separated hydrogen gas being first dried before mixing with the feed to remove any water swept up with the separated hydrogen gas, so that the level of water in the feed-hydrogen gas mixture is maintained at less than 5 parts by weight of water per million parts by weight of feed.

2. The process of claim 1 wherein the feed is first passed through a dryer to remove water therefrom.

3. The process defined in claim 2 wherein the catalyst employed is a mixture of porous, noncrystalline, inorganic cracking material; molecular sieves; and oxides of metals, sulfides of metals or metals in Group VI–A or Group VIII of the Periodic Table.

4. The process defined in claim 3 wherein the catalyst comprises an alumina-silica matrix including from about 10 to about 50 weight percent alumina and having dispersed therein from about 0.1 to about 0.5 parts by weight of molecular sieve per 1 part by weight of matrix, with said sieve-matrix mix being impregnated with from about 1 to about 30 weight percent based on the total catalyst weight of an oxide of cobalt or an oxide of molybdenum or a mixture of both.

5. The process defined in claim 3, wherein the conditions in the reactor are:
   a. temperatures ranging between about 600° and about 800°F.;
   b. pressures ranging between about 500 and about 2,500 p.s.i.g.;
   c. space velocities ranging between about 0.5 and about 3.0 volumes of feed per hour per volume of catalyst; and
   d. hydrogen feed ranging between about 500 and about 15,000 standard cubic feet per barrel of feed.